United States Patent
Choi et al.

(10) Patent No.: US 12,513,563 B2
(45) Date of Patent: Dec. 30, 2025

(54) PROVIDING TARGET WAKE TIME CONTROL FOR REDUCING TRAFFIC LATENCY AND/OR POWER CONSUMPTION

(71) Applicant: SAMSUNG ELECTRONICS CO., LTD., Suwon-si (KR)

(72) Inventors: Junsu Choi, Suwon-si (KR); Hyunkee Min, Suwon-si (KR); Jihoon Sung, Suwon-si (KR); Sunkey Lee, Suwon-si (KR); Junghun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 381 days.

(21) Appl. No.: 18/106,677

(22) Filed: Feb. 7, 2023

(65) Prior Publication Data
US 2023/0189056 A1 Jun. 15, 2023

Related U.S. Application Data

(63) Continuation of application No. PCT/KR2021/008679, filed on Jul. 7, 2021.

(30) Foreign Application Priority Data

Aug. 7, 2020 (KR) .................. 10-2020-0099335

(51) Int. Cl.
*H04W 28/02* (2009.01)
(52) U.S. Cl.
CPC .............................. *H04W 28/0268* (2013.01)

(58) Field of Classification Search
CPC . H04W 28/0268; H04W 28/02; H04W 28/24; H04W 52/02; H04W 52/0225; H04W 28/0236; H04W 52/0212
See application file for complete search history.

(56) References Cited

U.S. PATENT DOCUMENTS

| | | |
|---|---|---|
| 2013/0188541 A1 | 7/2013 | Fischer |
| 2015/0063182 A1 | 3/2015 | Wang |
| 2015/0063318 A1 * | 3/2015 | Merlin .................. H04L 5/0007 370/336 |

(Continued)

FOREIGN PATENT DOCUMENTS

| | | | |
|---|---|---|---|
| WO | 2019-125086 | 6/2019 | |
| WO | WO-2019125086 A1 * | 6/2019 | ........... G06F 1/3209 |

OTHER PUBLICATIONS

"Joint optimization of TWT mechanism and scheduling for IEEE 802.11ax" Jun. 2020 (Year: 2020).*

(Continued)

*Primary Examiner* — Mewale A Ambaye
(74) *Attorney, Agent, or Firm* — NIXON & VANDERHYE P.C.

(57) ABSTRACT

A target wake time (TWT) control method of an electronic device according to an embodiment includes: obtaining a TWT parameter comprising TWT interval information based on a target wake (TWT) agreement with an access point; obtaining the next target wake time (TWT) agreement with an access point; obtaining the next target wake time (TWT) based on the TWT interval information included in the TWT parameter and a traffic state received from the access point; and transmitting a TWT information frame comprising the next target wake time to the access point.

19 Claims, 13 Drawing Sheets

(56) References Cited

U.S. PATENT DOCUMENTS

| | | | |
|---|---|---|---|
| 2016/0269993 A1 | 9/2016 | Ghosh | |
| 2017/0311258 A1 | 10/2017 | Asterjadhi et al. | |
| 2017/0347372 A1 | 11/2017 | Li et al. | |
| 2018/0063788 A1 | 3/2018 | Yang et al. | |
| 2018/0302194 A1 | 10/2018 | Wang et al. | |
| 2019/0045438 A1 | 2/2019 | Cariou et al. | |
| 2019/0053155 A1 | 2/2019 | Kneckt et al. | |
| 2019/0075521 A1 | 3/2019 | Kneckt et al. | |
| 2019/0253967 A1 | 8/2019 | Xiao et al. | |
| 2020/0084102 A1 | 3/2020 | Choi et al. | |
| 2020/0221381 A1 | 7/2020 | Homchaudhuri et al. | |
| 2022/0217638 A1* | 7/2022 | Nayak | H04W 52/0258 |
| 2022/0346007 A1* | 10/2022 | Alpert | H04W 52/0216 |
| 2025/0016683 A1* | 1/2025 | Ajami | H04W 52/0216 |
| 2025/0016830 A1* | 1/2025 | Hedayat | H04W 74/0816 |
| 2025/0071621 A1* | 2/2025 | Asterjadhi | H04L 1/1896 |

OTHER PUBLICATIONS

Karaca, "Joint optimization of TWT mechanism and scheduling for IEEE 802.11ax", arXiv:2006.02235v1, Jun. 1, 2020, 14 pages.
International Search Report for PCT/KR2021/008679, mailed Sep. 27, 2021, 5 pages.
Written Opinion of the ISA for PCT/KR2021/008679, mailed Sep. 27, 2021, 4 pages.

* cited by examiner

PROVIDING TARGET WAKE TIME CONTROL FOR REDUCING TRAFFIC LATENCY AND/OR POWER CONSUMPTION

CROSS-REFERENCE TO RELATED APPLICATIONS

This application is a continuation of International Application No. PCT/KR2021/008679 designating the United States, filed on Jul. 7, 2021, in the Korean Intellectual Property Receiving Office and claiming priority to Korean Patent Application No. 10-2020-0099335, filed on Aug. 7, 2020, in the Korean Intellectual Property Office, the disclosures of which are incorporated by reference herein in their entireties.

BACKGROUND

Field

The disclosure relates to a target wake time (TWT) control method, and an electronic device and/or a communication module supporting the same.

Description of Related Art

As the use of electronic devices increases with the advancement of technology, the types of applications and traffic executed on the electronic devices have increased and diversified. Accordingly, needs for wireless access increase, and an improvement in network performance is required.

Accordingly, the institute of electrical and electronics engineers (IEEE) and the Wi-Fi Alliance have been collaborating to improve wireless standards. The new standard 802.11ax (or Wi-Fi 6) is focused on improving efficiency in such a way that one access point (AP), such as an airport or stadium, handles multiple electronic devices substantially simultaneously or sequentially.

Contention of multiple electronic devices communicating with one access point (AP) and/or battery life of each electronic device may be improved through a target wake time (TWT) function. The TWT function is a function that remains in an inactive state until the electronic device transmits data according to a negotiated schedule with an external electronic device such as an AP, which may improve the battery life of the electronic device.

TWT parameters including initial target wake time information and TWT interval information negotiated between the electronic device and the AP for the TWT function may affect latency or throughput related to quality of service (QoS) experienced by a user as well as power efficiency of the electronic device.

However, determination of the TWT parameter according to QoS requirements of various services is a very complex problem, and various services available in electronic devices have different traffic characteristics so that a different TWT parameter should be able to be configured for each service in order to satisfy the QoS requested by the service.

In addition, even in the same service, since traffic characteristics that change depending on the network state and service state may change, the TWT parameter of the electronic device should be controllable in real-time to provide the QoS required by the service.

SUMMARY

Embodiments of the disclosure provide a target wake time (TWT) control method for reducing traffic latency and/or power consumption, and an electronic device and/or communication module supporting the same.

According to various example embodiments of the disclosure, in a wireless local area network (LAN) according to the IEEE 802.11 standard, an electronic device that supports electronic devices (e.g., stations {STAs}) to access a wireless medium (e.g., a wireless channel) at different times may be provided.

According to various example embodiments, a target wake time (TWT) control method of an electronic device may include: acquiring a TWT parameter including TWT interval information based on a TWT agreement with an access point (AP); acquiring a next TWT based on the TWT interval information included in the TWT parameter and a state of traffic received from the AP; and transmitting a TWT information frame including the next TWT to the AP.

According to various example embodiments, an electronic device may include: a communication module comprising communication circuitry, and a processor configured to be operatively connected to the communication module, wherein the processor may be configured to: acquire a target wake time (TWT) parameter including TWT interval information based on a TWT agreement with an AP, acquire a next TWT based on the TWT interval information included in the TWT parameter and a state of traffic received from the AP, and control the communication module to transmit a TWT information frame including the next TWT to the AP.

According to various example embodiments, a communication module may include a transceiver and a communication processor configured to be operatively connected to the transceiver, wherein the communication processor may be configured to acquire a target wake time (TWT) parameter including TWT interval information based on a TWT agreement with an AP, to acquire a next TWT based on the TWT interval information included in the TWT parameter and a state of traffic received from the AP, and to transmit a TWT information frame including the next TWT to the AP.

According to various example embodiments of the disclosure, there are provided a TWT control method that can reduce traffic latency and/or power consumption by configuring a TWT parameter for each service and temporarily adjusting a TWT schedule without the need to release an existing TWT agreement, and an electronic device and a communication module supporting the same.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
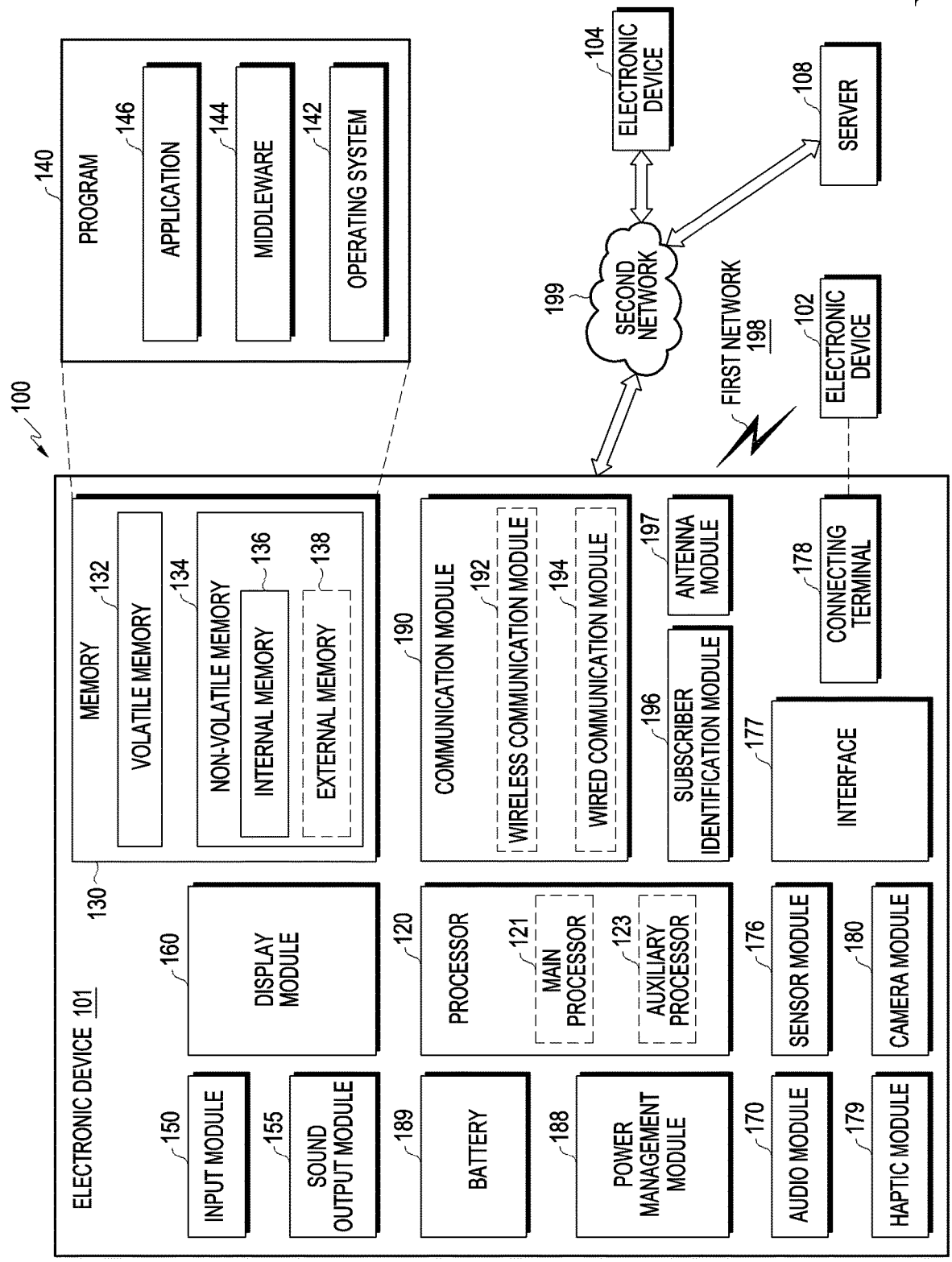
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
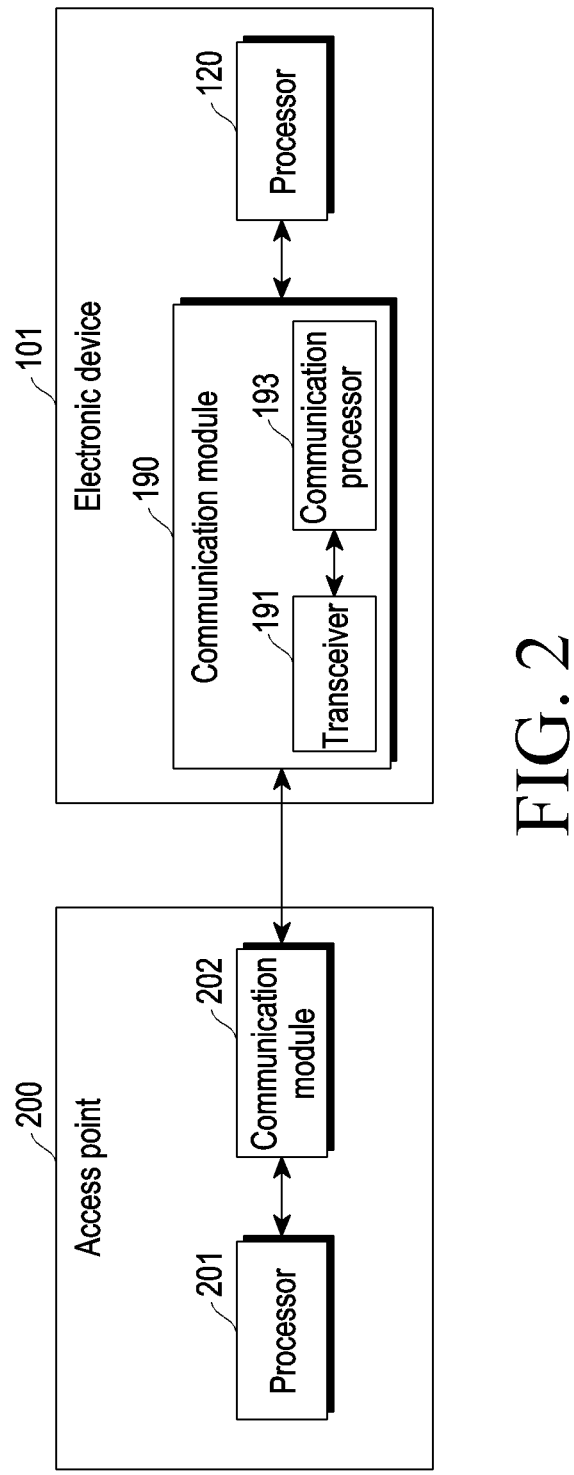
FIG. 2 is a block diagram illustrating an example configuration of an electronic device and an access point (AP) according to various embodiments.

FIG. 2 is a block diagram illustrating an example configuration of an electronic device and an access point (AP) according to various embodiments.

According to various embodiments, an AP 200 may be a wireless router. The AP 200 may be a dedicated wireless router, or may be a general-purpose device supporting a mobile hotspot function, and there is no limitation in the implementation of the AP 200. For example, the AP 200 may include the same or similar components as the electronic device 101 (e.g., the processor (e.g., including processing circuitry) 201 {e.g., the processor 120 of FIG. 1} and/or the communication module (e.g., including communication circuitry) 202 {e.g., the communication module 190 of FIG. 1}). When the electronic device 101 supports peer-to-peer (P2P) communication (e.g., Wi-Fi direct), the AP 200 may include an electronic device (e.g., the electronic device 102 of FIG. 1) operating as a soft AP.

According to various embodiments, the AP 200 may transmit/receive data to and from an external device such as a server (e.g., the server 108 in FIG. 1) or the electronic device 101 through the communication module 202 under the control of the processor 201. For example, the AP 200 may transmit at least a portion of traffic received from the server to the electronic device 101. According to various embodiments, the AP 200 and the electronic device 101 may transmit/receive uplink (UL)/downlink (DL) data during a TWT service period. For example, the AP 200 may transmit traffic to the electronic device 101 only during the TWT service period of the electronic device 101 according to a TWT agreement with the electronic device 101.

According to various embodiments, the TWT service period may be configured by a TWT parameter configured based on at least one of communication performance of the electronic device 101 and the AP 200, or a service type.

Referring to FIG. 2 the electronic device 101 may include the processor (e.g., including processing circuitry) 120 and a communication module (e.g., including communication circuitry) 190.

According to various embodiments, the communication module 190 may include various communication circuitry and receive a communication signal from the outside or transmit a communication signal to the outside based on a Wi-Fi communication method (e.g., IEEE 802.11ax). For example, the communication module 190 may operate based on IEEE 802.11ax among Wi-Fi communication methods, and compared to the IEEE 802.11ac, an orthogonal frequency division multiplexing (OFDM) discrete Fourier transform (DFT) period (e.g., 12.8 µs) is increased by 4 times and 256 medium access control (MAC) protocol data unit (MPDU) aggregation may be supported.

According to various embodiments, the communication module 190 may include a transceiver 191 configured to transmit and receive data to and from an external electronic device and a communication processor 193 (e.g., a communication processor {not shown} or a short-range wireless communication module {e.g., Wi-Fi chipset}).

According to various embodiments, the transceiver 191 may convert a baseband transmission signal into a wireless signal or convert a received wireless signal into a baseband reception signal.

According to various embodiments, the communication module 190 may further include a component for OFDM or orthogonal frequency division multiple access (OFDMA), for example, a modulator, a digital-analog converter (D/A), a frequency converter, an A/D converter, an amplifier, and/or a demodulator, in addition to the transceiver 191 and the communication processor 193.

Although not shown, according to various embodiments, the electronic device 101 and/or the AP 200 may include at least one antenna module (e.g., the antenna module 197 of FIG. 1 that includes at least one antenna) configured to be electrically connected to a communication module (e.g., the communication module 190 and/or the communication module 202) and to support a communication protocol and/or frequency band supported by the communication module.

According to various embodiments, the processor 120 may include an application processor. The processor 120 may include various processing circuitry and perform a designated operation of the electronic device 101 or may control another hardware (e.g., the communication module 190) to perform a designated operation.

According to various embodiments, the processor 120 may control the communication module 190 to establish a communication connection (e.g., the first network 198 of FIG. 1) with the AP 200. For example, the communication connection may include a Wi-Fi network. For example, the processor 120 may control the communication module 190 to establish a wireless connection with the AP 200 using the wireless local area network (WLAN) standard of a 2.4 GHz, 5 GHz, or 6 GHz band of IEEE 802.11ac or 802.11ax. Alternatively, the processor 120 may control the communication module 190 to establish a wireless connection with the AP 200 using the WLAN standard of 60 GHz band of IEEE 802.11ad or 802.11ay.

According to various embodiments, a WLAN (e.g., the first network 198 of FIG. 1) may include a plurality of electronic devices (e.g., STAs) and an AP (e.g., the electronic device 102 of FIG. 1). At least one of the plurality of electronic devices may have substantially the same configuration as at least one of the configurations of the electronic device 101 of FIG. 1. According to various embodiments, based on a connection between the plurality of electronic devices 101 and an external electronic device (e.g., Internet, external LAN, or cellular network), the AP 200 may support an operation of transmitting data to the external network and/or an operation of receiving data from the external network by the plurality of electronic devices 101.

According to various embodiments, the processor 120 may activate the communication module 190 according to a TWT agreement with the AP 200. For example, the processor 120 may establish a TWT agreement with a TWT parameter including an initial target wake time and TWT interval information, which is determined in consideration of long-term traffic characteristics, and may activate the communication module 190 based on the TWT parameter.

According to various embodiments, the processor 120 may establish a TWT agreement for determining the TWT parameter using the AP 200 and a TWT protocol. For example, the TWT parameter may include a service start time (e.g., TWT start time), a TWT service period, and a service restart interval (e.g., an TWT interval).

According to an embodiment, the electronic device 101 and the AP 200 may perform time synchronization between devices. For example, the AP 200 may transmit a frame including a timing synchronization function (TSF) so that the electronic device 101 and a timer of the AP 200 may be synchronized. The electronic device 101 and the access point 200 may operate according to the TWT start time, the TWT service period, or the TWT interval based on the synchronized timer.

According to various embodiments, the processor 120 may acquire a next TWT based on the state of traffic received from the AP 200. For example, the processor 120 may acquire the next TWT based on at least one of a TWT at which the TWT service period starts, TWT interval information (e.g., information indicating a period from when the TWT starts to the next iteration) included in the TWT parameter, and latency or a traffic load of traffic received from the AP 200. The latency may refer to the time it takes for one data packet to be transmitted to another point in a network. For example, latency may be defined as the time between the moment a data packet is sent from a source and the moment the data packet arrives at a destination. In addition, the latency may be defined by adding the time it takes for a packet (e.g., acknowledgment {ACK} of a destination to the packet sent by a source) to return from the destination to the source. According to various embodiments, services (e.g., voice {VO}, video {VI}, best effect {BE}, or background {BK}) supported by the AP 200 may be classified based on an access category (AC), and the TWT interval information may be configured based on acceptable latency for each service. A time interval between a time when traffic arrives at the AP 200 and a time when the TWT arrives and the electronic device 101 actually starts to receive traffic may be referred to as an offset. For example, the processor 120 may acquire the next TWT so that the offset is reduced. The traffic load may refer to an amount of reception of data that the electronic device 100 receives from the AP 200 for each service period. For example, the traffic load may be determined based on a change in the amount of reception of data received for each service period.

According to various embodiments, the processor 120 may receive, from the AP 200, information on a time when traffic is transmitted from a server (e.g., the server 108 of FIG. 1) and arrives at the AP 200 and information on latency, which is an interval during which traffic is transmitted from the AP 200 to the electronic device 101. For example, the latency of the traffic that the processor 120 receives from the AP 200 may include a communication delay between the AP 200 and the electronic device 101. According to an embodiment, the processor 120 may predict latency before traffic is transmitted from the server to the electronic device 101, based on a time stamp included in a data packet received from the AP 200. According to an embodiment, the processor 120 may detect a change in the latency based on the time stamp included in the data packet, and may determine that the TWT parameter needs to be corrected when the latency is increased.

According to various embodiments, the processor 120 may acquire (e.g., operation 902 of FIG. 9 {current TWT+ $T_{interval} - T_{unit\ time}$}), from a first TWT (e.g., a current TWT), a time (e.g. see Equation 1) after a time shorter than the TWT interval information included in the TWT parameter by the latency of the traffic received from the AP 200, as a second TWT (e.g., next TWT).

According to various embodiments, the processor 120 may transmit a TWT information frame including the acquired second TWT to the AP 200.

In the above, it has been described that the processor 120 activates the communication module 190 according to a TWT agreement, acquires the second TWT, and transmits the TWT information frame including the second TWT. However, according to various embodiments, without the control of the processor 120, the communication processor 193 may perform at least one operation of activating the communication module 190 according to the TWT agreement according to the disclosure, acquiring the second TWT, or transmitting the TWT information frame including the second TWT.

According to various embodiments, the communication processor 193 may acquire a TWT parameter including TWT interval information based on a TWT agreement with the AP 200.

According to various embodiments, the communication processor 193 may acquire the second TWT (e.g., next TWT) based on the TWT interval information included in the TWT parameter and the state of traffic received from the AP 200. For example, the state of the traffic may include at least one of latency, which is an interval between a time when traffic transmitted from the server arrives at the AP 200 and a time when traffic transmitted from the AP 200 arrives at the electronic device 101, or a traffic load received by the electronic device 101 from the AP 200.

According to various embodiments, the communication processor 193 may acquire, from the first TWT, a time after a time (e.g., $T_{interval} T_{unit\ time}$, $T_{interval} T_{unit\ time}$, $2*T_{interval}$ or $T_{interval}/2$) longer or shorter than the interval time included in the TWT interval information based on at least one of the latency or the traffic load, as the second TWT.

Figure 9:
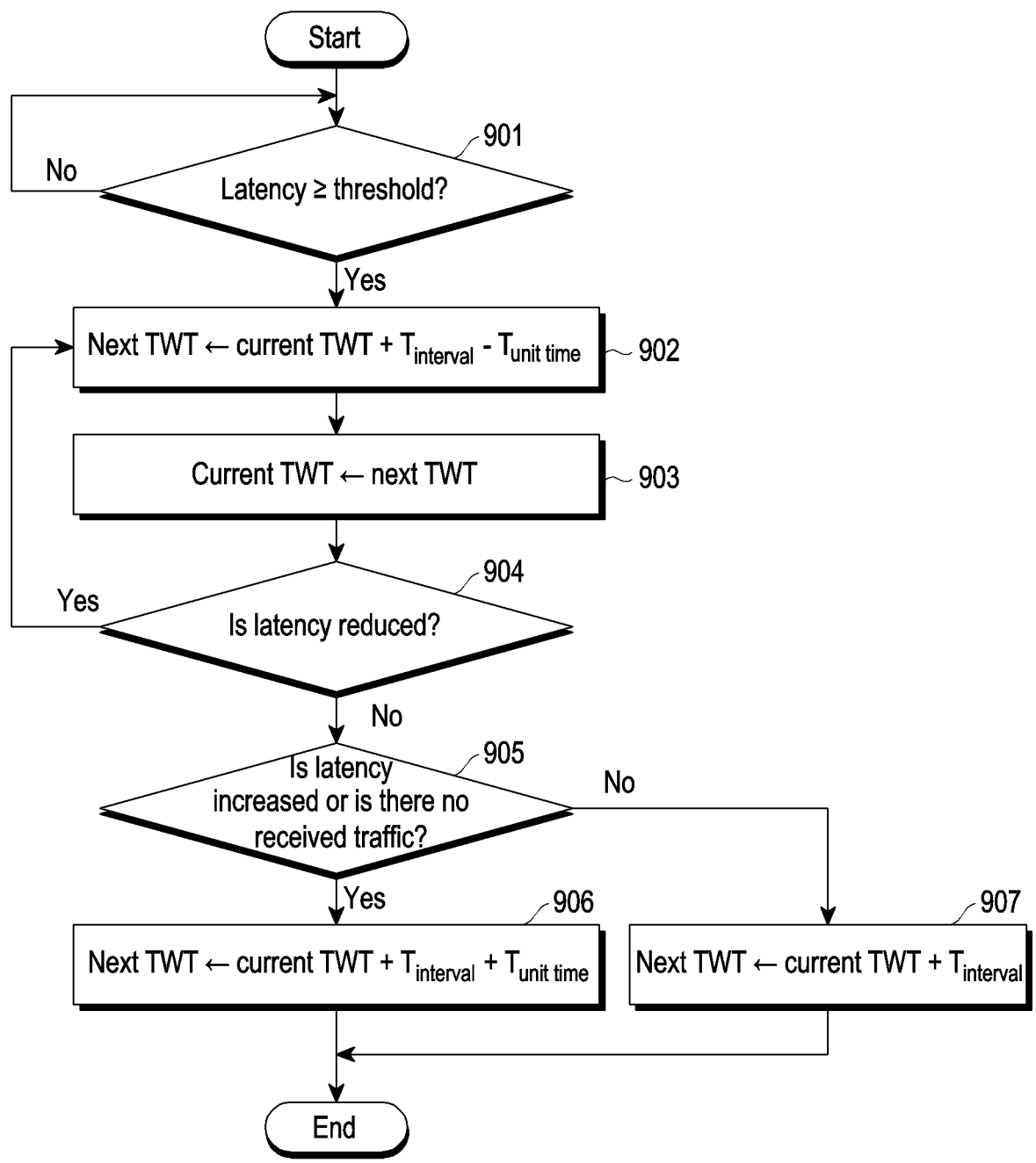
FIG. 9 is a flowchart illustrating a next TWT control operation according to various embodiments.
Figure 12:
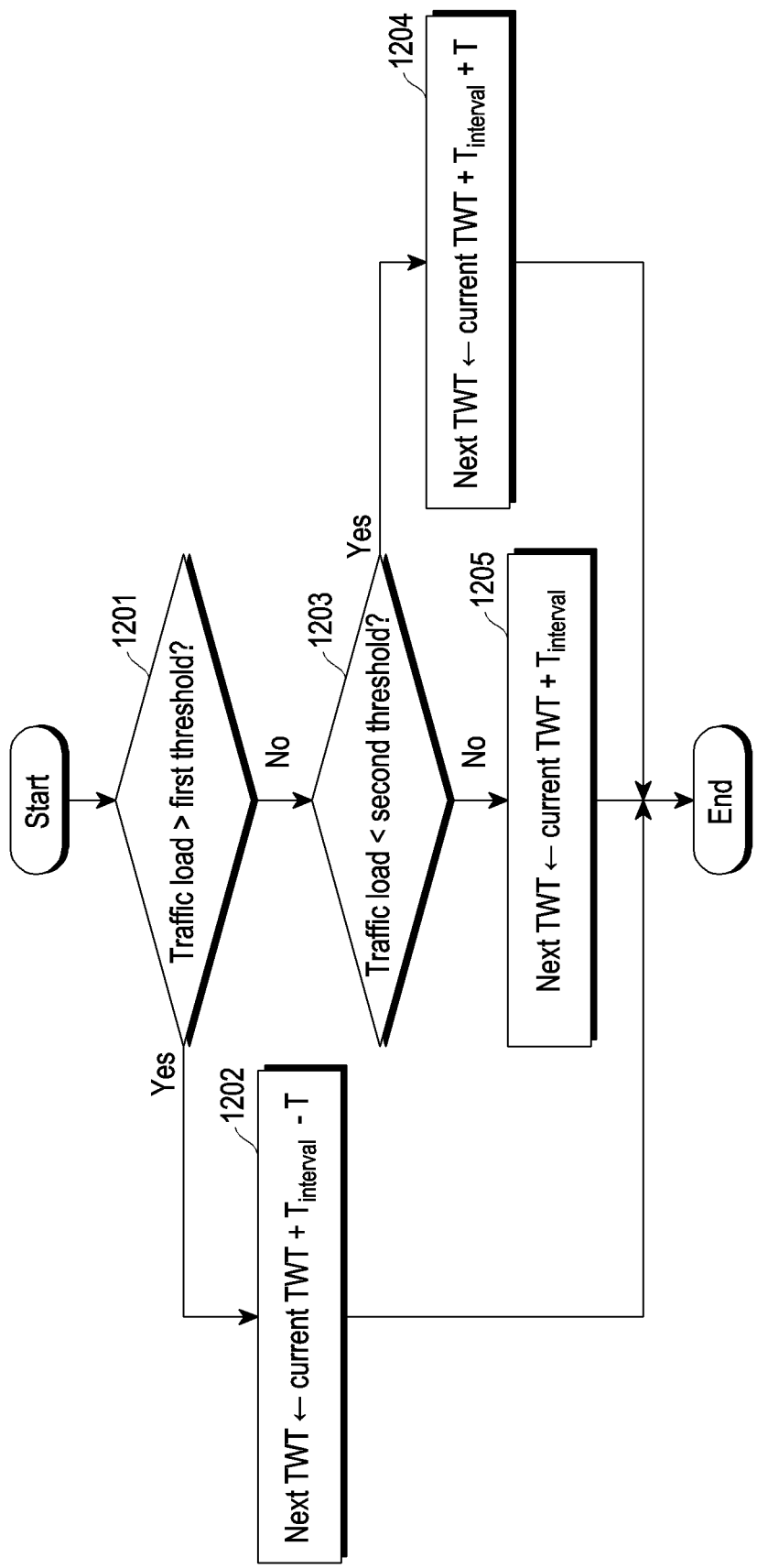
FIG. 12 is a flowchart illustrating an example next TWT control operation according to various embodiments.

According to various embodiments, the communication processor 193 may acquire a time after the interval time included in the TWT interval information from the first TWT, as the second TWT (e.g., operation 907 of FIG. 9 or operation 1205 of FIG. 12).

According to various embodiments, the communication processor 193 may transmit the TWT information frame including the second TWT to the AP 200.

According to various embodiments, the processor 120 may receive information on the second TWT from the AP 200. According to various embodiments, the AP 200 may perform TWT control for downlink (DL) traffic, and the electronic device 100 may perform TWT control for uplink (UP) traffic. For example, the AP 200 may acquire information on a time during which traffic is transmitted from the server and arrives at the AP 200 and latency that is an interval during which traffic is transmitted from the AP 200 to the electronic device 101, may acquire a time after a time shorter than the TWT interval information by the latency from the first TWT as the second TWT, and may transmit the acquired next TWT to the electronic device 101.

According to various embodiments, a TWT control method may be performed independently of each other by the processor 120 or the communication processor 193. For example, the electronic device 101 may be performed using the processor 120 and the transceiver 191 or the communication processor 193 and the transceiver 191. According to various embodiments, when performing activation of the communication module 190 according to the TWT agreement, acquisition of the second TWT and transmission of the TWT information frame including the acquisition of the second TWT, the processor 120 or the communication processor 193 may further confirm additional information in addition to TWT parameter set field information. For example, the TWT control operation may be performed based on information on an executing application, the amount of data packets, or network congestion. For example, the information on the executing application may be acquired from the processor 120, and the level of network congestion may be acquired from the communication processor 193. In addition, in performing the TWT control method, the TWT control method may be performed using an independent application that provides latency information. For example, the processor 120 or the communication processor 193 may identify the latency information for each service (e.g., VO, VI, BE, or BK) supportable by the AP 200, and may perform TWT control using an independent application that corrects or changes latency information. For example, the independent application may change the confirmed first latency information to second latency information later than the first latency information, and may transmit the changed latency information to the processor 120 or the communication processor 193. For example, the changing of the first latency information to the second latency information may be performed based on a user configuration or an operating state (e.g., CPU state or battery state) of the electronic device 101.

Figure 3:
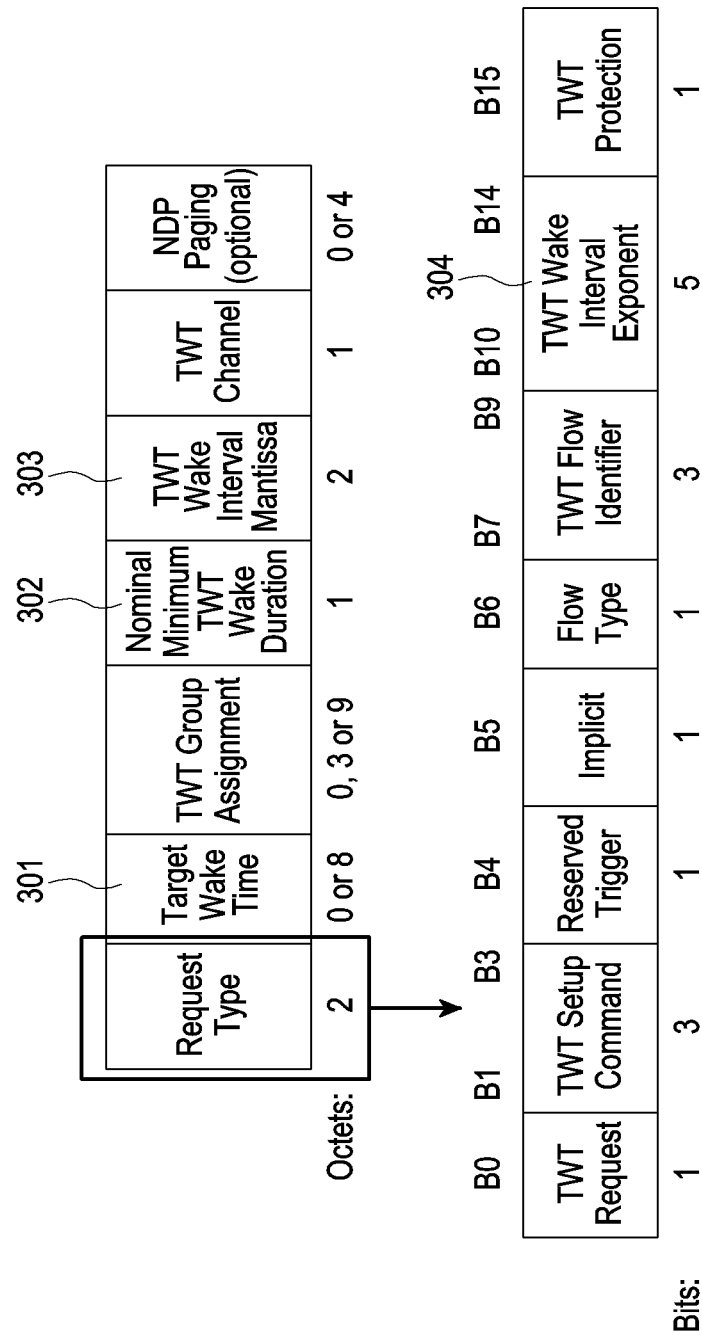
FIG. 3 is a diagram illustrating a TWT parameter according to various embodiments.

FIG. 3 is a diagram illustrating an example TWT parameter according to various embodiments.

According to various embodiments, the AP 200 and the electronic device 101 may establish a TWT agreement based on the TWT parameter set field shown in FIG. 3. According to various embodiments, the TWT parameter set field may be determined by the electronic device 101 and transmitted to the AP 200 at the time of the TWT agreement, or may be determined by the AP 200 and transmitted to the electronic device 101 at the time of the TWT agreement. According to an embodiment, the TWT parameter set field may be determined based on a response of the AP 200 to a request including a parameter determined by the electronic device 101. For example, the AP 200 may determine a parameter value through negotiation with the electronic device 101 based on network conditions of a plurality of electronic devices communicatively connected to the AP 200.

Figure 4:
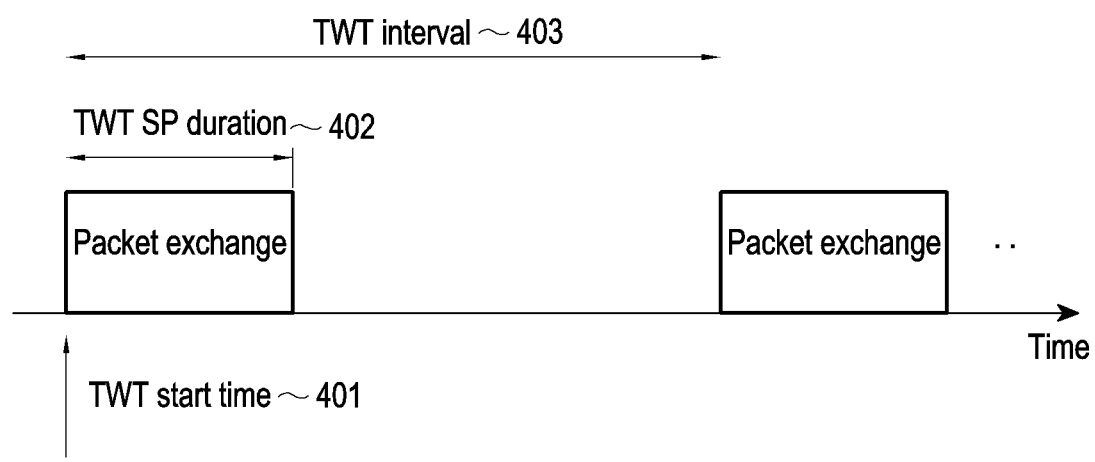
FIG. 4 is a diagram illustrating a communication period according to a TWT agreement according to various embodiments.

According to various embodiments, when the TWT agreement is made, the electronic device 101 may periodically wake up to communicate with the AP 200 based on the TWT parameter set field. For example, referring to FIG. 4, the electronic device 101 may periodically wake up to receive a data packet from the AP 200 or transmit a data packet to the AP 200.

A TWT 301 included in the TWT parameter set field may include information on a service start time at which the electronic device 101 wakes up to exchange data packets with the AP 200. For example, the TWT 301 may be information on a TWT start time 401 shown, for example, in FIG. 4.

A nominal minimum TWT wake duration 302 included in the TWT parameter set field may include information on a period during which a service is maintained. For example, when there is no transmitted traffic, the nominal minimum TWT wake duration 302 may include information on a minimum period during which the electronic device 101 must wait before entering a doze state (e.g., a sleep state). For example, the nominal minimum TWT wake duration 302 may include information on a TWT service period (SP) duration 402 shown in FIG. 4.

According to various embodiments, the electronic device 101 may include PS-Poll, unscheduled automatic power save delivery (U-APSD), scheduled automatic power save delivery (S-APSD), and tunneled direct-link setup (TDLS) peer power saving modes as the power saving mode related to the doze state. For example, the PS-Poll operation mode may include acquiring, by the electronic device 101, a traffic indication map (TIM) transmitted by the AP 200. For example, the U-APSD operation mode may be similar to the PS-Poll operation mode. The electronic device 101 may receive a trigger frame from the AP 200, and may allow the PS-Poll or the U-APSD frame to be included in a high efficiency trigger based (HE TB) physical layer convergence protocol (PLCP) protocol data unit (PPDU) to make a response. In addition, the trigger frame may include an arbitrary data frame (e.g., QoS data or QoS Null) having an access category (AC) indication.

A TWT wake interval mantissa 303 and a TWT wake interval exponent 304 included in the TWT parameter set field may include information on a period in which the service period is restarted. For example, the TWT wake interval mantissa 303 and/or the TWT wake interval exponent 304 may include information on a TWT interval 403 shown in FIG. 4.

Figure 5:
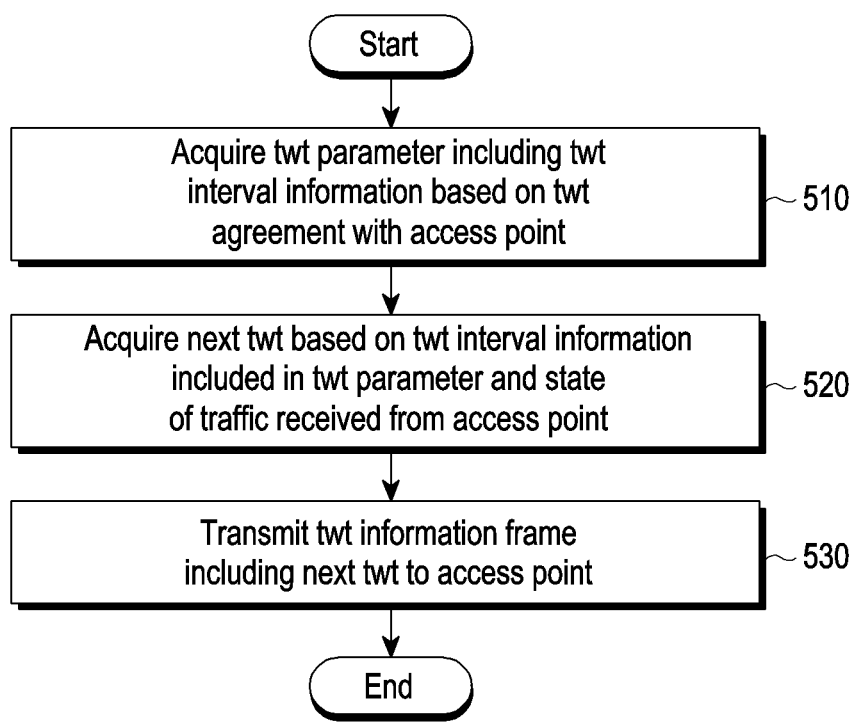
FIG. 5 is a flowchart illustrating an example TWT control operation of an electronic device according to various embodiments.

FIG. 5 is a flowchart illustrating an example TWT control operation of an electronic device according to various embodiments.

According to various embodiments, in operation 510, the electronic device 101 (e.g., the processor 120 or the communication processor 193 of the communication module 190) may acquire a TWT parameter including TWT interval information based on a TWT agreement with an AP (e.g., the AP 200). For example, the electronic device 101 may acquire the TWT parameter including the TWT interval information (e.g., the TWT wake interval mantissa 303 and/or the TWT wake interval exponent 304 of FIG. 3) based on the TWT agreement with the AP 200. The TWT parameter may further include the TWT 301 that is information on the service start time as shown in FIG. 3 and the nominal minimum TWT wake duration 302 that is information on the service period in addition to the TWT interval information. According to an embodiment, the electronic device 101 and the AP 200 may establish a TWT agreement for each application (or service) performed in the electronic device 101. For example, when there are a plurality of applications (or services) executed in the electronic device 101, the electronic device 101 and the AP 200 may establish a plurality of TWT agreements.

According to various embodiments, the electronic device 101 may consider the characteristics of traffic received from the AP 200 to establish a TWT agreement having another TWT parameter for the purpose of better QoS (e.g., low latency). For example, QoS is information related to a service provided to the electronic device 101, and a service with a high (better) QoS may include a service requiring seamless service provision, such as video streaming or voice over internet protocol (VoIP).

Figure 6:
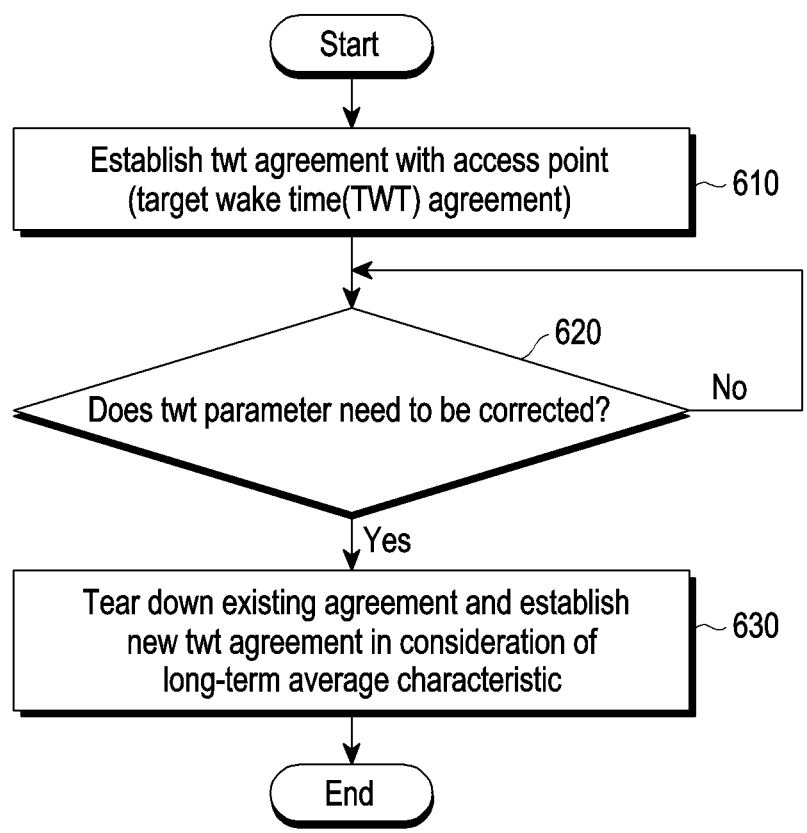
FIG. 6 is a flowchart illustrating an example TWT agreement operation of an electronic device according to various embodiments.

For example, referring to FIG. 6, in operation 610, the electronic device 101 may establish a TWT agreement with the AP 200. According to various embodiments, operation 610 may be the same or similar operation as operation 510 of FIG. 5.

According to various embodiments, in operation 620, the electronic device 101 may determine whether the TWT parameter is required to be corrected. For example, the electronic device 101 may determine whether the TWT parameter is required to be corrected in consideration of traffic characteristics.

According to various embodiments, the electronic device 101 may determine whether the TWT parameter is required to be corrected according to traffic characteristics of an application executed in the electronic device 101. For example, when an application different from the application executed at the time of the TWT agreement is executed, the electronic device 101 may identify a TWT parameter corresponding to the application executed in the electronic device 101 using a pre-stored database. The database may include TWT interval information and minimal wake duration information (e.g., the nominal minimum TWT wake duration 302 of FIG. 3) for each application.

According to various embodiments, the electronic device 101 may determine that the TWT parameter needs to be corrected when the executed application is changed, or may determine that the TWT parameter needs to be corrected when a difference between the agreed TWT parameter and the TWT parameter corresponding to the changed application is equal to or greater than a predetermined threshold. For example, when the network characteristic (e.g., QoS) of the executed application is changed, the electronic device 101 may determine that the TWT parameter needs to be corrected (or new TWT agreement).

According to an embodiment, the electronic device 101 may determine whether the TWT parameter needs to be corrected by collecting and analyzing traffic statistics. For example, the electronic device 101 may determine whether the TWT parameter needs to be modified by collecting and analyzing an average reception period of traffic received for a predetermined period or an interval during which the reception is continued.

For example, when the reception period of the collected and analyzed traffic or the interval during which the reception is continued differ from a TWT interval (e.g., the TWT interval 403 of FIG. 4) based on the TWT parameter or a TWT SP duration (e.g., the TWT SP duration 402 of FIG. 4) by a predetermined threshold or greater, the electronic device 101 may determine that the TWT parameter needs to be corrected.

According to various embodiments, when it is determined that the TWT parameter does not need to be corrected (620—NO), the electronic device 101 may perform TWT based on the agreed TWT parameter, and may repeatedly determine whether the TWT parameter needs to be corrected. According to various embodiments, when the TWT parameter does not need to be corrected, the electronic device 101 may acquire a next TWT according to operation 520 of FIG. 5.

According to various embodiments, when it is determined that TWT parameter needs to be corrected (620—YES), in operation 630, the electronic device 101 may tear down the existing agreement and may establish a new TWT agreement in consideration of a long-term average characteristic. According to various embodiments, the electronic device 101 may establish the new TWT agreement with the TWT parameter identified in a database or the TWT parameter based on the reception period of the collected and analyzed traffic or the interval during which the reception is continued.

According to various embodiments, the electronic device 101 may establish the new TWT agreement based on the long-term traffic characteristic, or may adjust a communication time with the AP 200 based on a temporary change in the network status and/or service status. For example, the electronic device 101 may monitor the average traffic characteristic related to the executed application or service, and may establish the new TWT agreement or adjust the communication time with the AP 200 based on the traffic characteristic. As another example, the electronic device 101 may establish the new TWT agreement based on average statistics at a designated period (e.g., units of tens of seconds or several minutes), and may adjust the communication time with the AP 200 within the designated period. For another example, when the type of an application or a service (e.g., an access category such as voice {VO}, video {VI}, best effect {BE}, or background {BK}) is changed, the TWT agreement may be newly established.

According to various embodiments, in operation 520, based on the TWT interval information included in the TWT parameter and the status of the traffic received from the AP 200, the electronic device 101 may acquire the next TWT. For example, the electronic device 101 may acquire the next TWT based on at least one of traffic latency and traffic load. An embodiment of acquiring the next TWT based on the traffic latency will be described below with reference to FIGS. 8 to 10, and an embodiment of acquiring the next TWT based on the traffic load will be described in greater detail below with reference to FIGS. 11A, 11B, 12, 13A, 13B and 13C.

According to various embodiments, in operation 530, the electronic device 101 may transmit a TWT information frame including the next TWT to the AP 200.

Figure 7:
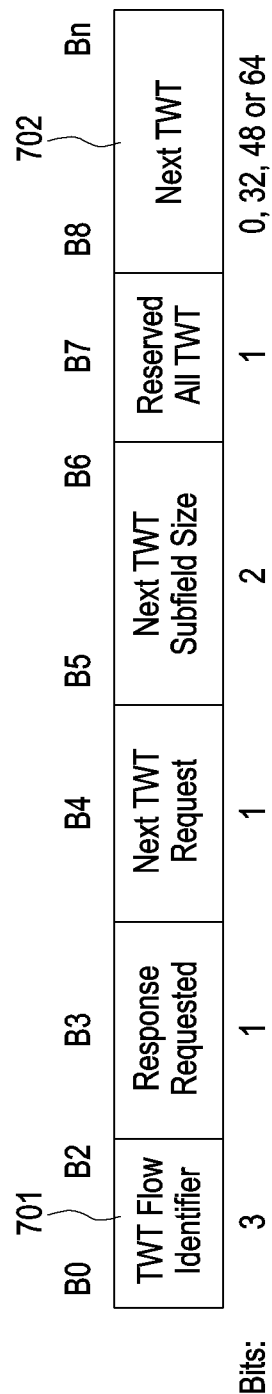
FIG. 7 is a diagram illustrating a TWT information frame according to various embodiments.

FIG. 7 is a diagram illustrating an example TWT information frame according to various embodiments. For example, The TWT information frame may include a TWT information field as shown in FIG. 7. A TWT flow identifier 701 included in the TWT information frame may include information for identifying the existing TWT agreement. The next TWT 702 included in the TWT information frame may include information related to suspension or resumption of the existing TWT agreement. For example, when the next TWT 702 does not exist in the TWT information frame, the electronic device 101 may suspend the TWT agreement identified by the TWT flow identifier 701 based on the TWT information frame in which the next TWT 702 does not exist. As an embodiment, when the next TWT 702 exists in the TWT information frame, the electronic device 101 may replace the next wake time with a value of the next TWT 702 based on the TWT information frame in which the next TWT 702 exists. For example, the electronic device 101 may replace a value identified in response to the TWT 301 of the TWT parameter shown in FIG. 3 with the value of the next TWT 702. In an embodiment, the electronic device 101 may replace a service start time (e.g., TWT start time) of the TWT parameter with the value of the next TWT 702, and may maintain the TWT service period and an interval (e.g., TWT interval) during which the service is resumed.

According to various embodiments, the electronic device 101 may not correct the TWT interval information included in the TWT parameter except for a method of newly establishing the TWT agreement with the AP 200, but the electronic device 101 may adjust the next TWT 702 of the TWT information frame and transmit the adjusted next TWT 702 to the AP 200, thereby controlling the TWT without establishing the new TWT agreement. Accordingly, it is possible to temporarily adjust a TWT schedule without the need to cancel and/or re-establish the existing TWT agreement. The operation of adjusting the value of the next TWT 702 of the TWT information frame will be described below with reference to FIGS. 9 to 13C.

According to various embodiments, when the next TWT included in the TWT information frame reflects only the TWT interval information included in the TWT parameter and is different from the next TWT, the electronic device 101 may transmit the TWT information frame to the AP 200. In an embodiment, when the next TWT included in the TWT information frame is obtained by reflecting only the TWT interval information included in the TWT parameter, the electronic device 101 does not transmit the TWT information frame to the AP 200.

Figure 8:
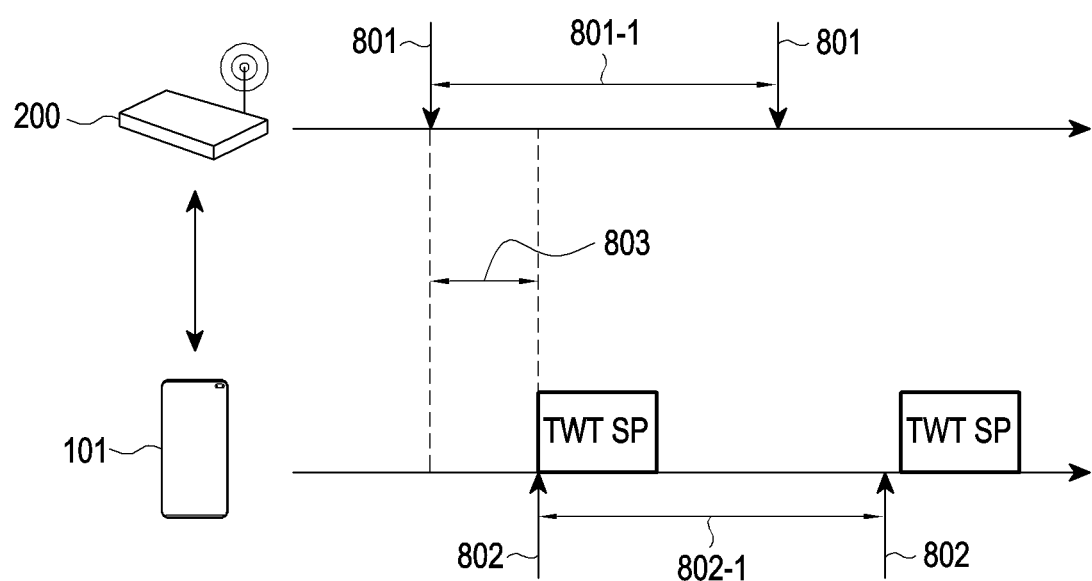
FIG. 8 is a diagram illustrating latency of traffic according to various embodiments.

FIG. 8 is a diagram illustrating an example of latency of traffic according to various embodiments. The latency refers to the time it takes for one data packet to be sent to another point in a network.

According to various embodiments, when the electronic device 101 is not awake (e.g., when it is not the TWT SP start time 802), the transmission of traffic to the AP 200 is delayed until the electronic device 101 wakes up and communicates with the AP 200, the latency of the traffic may increase.

For example, referring to FIG. 8, the latency of the traffic may be a time interval 803 between a time point 801 when the traffic arrives at the AP 200 from a server and a TWT SP start time 802 (e.g., the TWT start time 401 of FIG. 4) when the electronic device 101 wakes up to communicate with the AP 200.

According to various embodiments, as shown in FIG. 8, even if an interval 801-1 during which the traffic arrives at the AP 200 from the server is the same as an interval 802-1 of the TWT SP start time, since user's experience of using the network is deteriorated due to an increase in the latency (e.g., the time interval 803) by the offset, the TWT may be controlled to reduce the latency as shown in FIG. 9.

FIG. 9 is a flowchart illustrating an example next TWT control operation according to various embodiments.

The operation of an electronic device (e.g., the electronic device 101 of FIG. 3) in FIG. 9, may be performed by a processor (e.g., the processor 120 or the communication processor 193 of the communication module 190) of the electronic device 101.

Referring to FIG. 9, according to various embodiments, in operation 901, the electronic device 101 may determine whether latency is equal to or greater than a threshold.

According to various embodiments, the electronic device 101 may identify latency of traffic based on time stamp information of a transmission layer (e.g., TCP or UDP). For example, the electronic device 101 may identify latency, which is a time taken for the traffic to be transmitted from the server to reach the electronic device 101, based on a time stamp when the traffic is generated by the server (e.g., the server 108 of FIG. 1) and time information at a time point when the traffic is received from an AP (e.g., the AP 200 in FIG. 3). For example, when the latency for the traffic transmitted from the server and arrived at the electronic device 101 increases or is equal to or greater than a designated threshold, the electronic device 101 may determine that a TWT control operation (e.g., transmission of TWT information frame in which the next TWT 702 of FIG. 7 is configured) needs to be performed.

According to various embodiments, when a time sensitive network (TSN) in which the server, the AP 200, and the electronic device 101 share a global reference time is applied, the electronic device 101 may identify the latency of the traffic based on time when the traffic arrives at the AP 200 from the server and time information at a time point when the traffic is received from the AP 200 to the electronic device 101.

According to various embodiments, when the latency is less than the threshold (operation 901—NO), the electronic device 101 may acquire the next TWT by reflecting only the interval time included in the TWT interval information, and may repeatedly perform operation 901 of determining whether the latency is equal to or greater than the threshold. For example, the electronic device 101 may perform operation 901 whenever a data packet is received from the AP 200.

According to various embodiments, when the latency is greater than or equal to the threshold (operation 901—YES), in operation 902, the electronic device 101 may acquire the next TWT as in Equation (1).

$$\text{Next TWT} \leftarrow \text{current TWT} + T_{interval} - T_{unit\ time} \qquad (1)$$

For example, the current TWT may be a start time of the current TWT service period for communication with the AP 200.

The $T_{interval}$ may refer to an interval time included in the TWT interval information included in the TWT parameter. The $T_{unit\ time}$ (e.g., $\Delta T_{offset}$) may be designated by a manufacturer.

According to various embodiments, when the latency is equal to or greater than the threshold or a predetermined period, the electronic device 101 may acquire, as the next TWT (e.g., the next TWT 702 of FIG. 7), a time (e.g., current $TWT+T_{interval}-T_{unit\ time}$) after a time shorter by a unit time (e.g., $T_{unit\ time}$) than the interval time included in the TWT interval information (e.g., TWT wake interval mantissa 303 and/or TWT wake interval exponent 304) of the TWT parameter from the current TWT (e.g., the TWT 301 of FIG. 3).

According to various embodiments, the electronic device 101 may transmit the TWT information frame including the acquired next TWT to the AP 200.

In the above, it has been described that the next TWT is acquired using Equation (1) when the latency of the traffic is greater than the threshold. However, according to various embodiments, the electronic device 101 may acquire the next TWT using Equation (1) according to a predetermined period without comparing the latency of the traffic with the threshold.

According to various embodiments, in operation 903, the electronic device 101 may change the current TWT (e.g., a value identified by the TWT 301 of FIG. 3) based on the next TWT (e.g., the next TWT 702 of FIG. 7) included in the transmitted TWT information frame.

According to various embodiments, when the changed TWT is reached, the electronic device 101 may start a TWT service (e.g., a TWT service period) and may communicate with the AP 200.

According to various embodiments, in operation 904, the electronic device 101 may determine whether the latency has been reduced. For example, the electronic device 101 may determine whether the latency for the traffic received from the AP 200 after the service period of the previous TWT is over is more reduced than the latency identified in the service period of the previous TWT.

For example, when the latency identified in the service period of the current TWT is more reduced than the latency identified in the service period of the previous TWT (operation 904—YES), the electronic device 101 may return to operation 902 to acquire the next TWT based on Equation (1).

Figure 10:
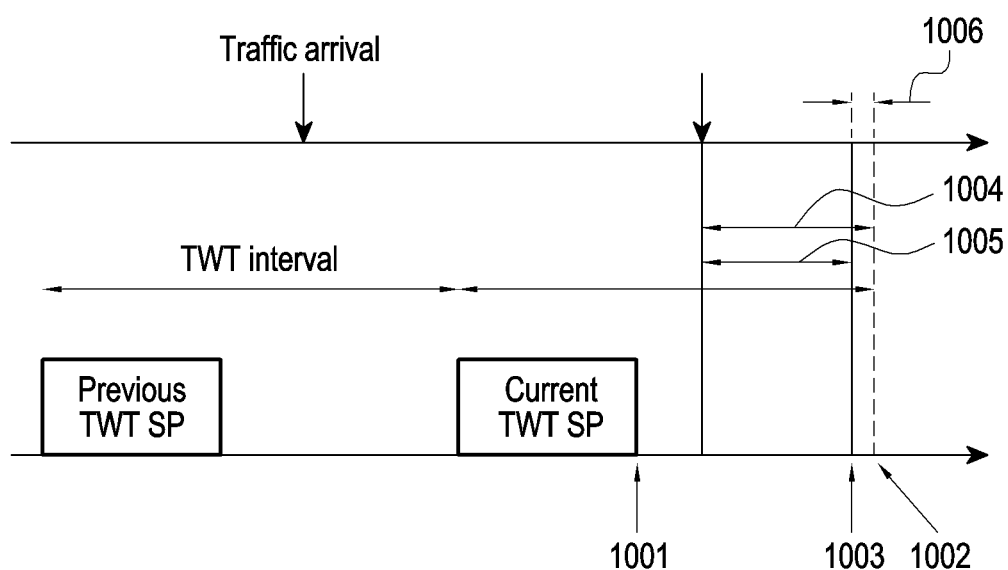
FIG. 10 is a diagram illustrating a next TWT controlled according to various embodiments.

For example, as shown in FIG. 10, the electronic device 101 may transmit the TWT information frame including the next TWT to the AP 200 at an end time 1001 of the current TWT service period.

According to various embodiments, the electronic device 101 may wake up at a time 1003 earlier by a unit time 1006 (e.g., $T_{unit\ time}$) than a TWT 1002 obtained by reflecting only the interval time included in the TWT interval information according to the TWT agreement, and may communicate with the AP 200. Due to this, the latency 1005 of the traffic may be reduced by the unit time 1006 (e.g., $T_{unit\ time}$) than the latency 1004 based on the TWT agreement.

According to various embodiments, when the latency decreases, the electronic device 101 may acquire the next TWT based on Equation (1) to gradually decrease the latency.

According to various embodiments, when the latency identified in the service period of the current TWT is not reduced compared to the latency identified in the service period of the previous TWT (operation 904—NO), in operation 905, the electronic device 101 may determine whether no traffic is received during the service period of the current TWT or whether the latency identified in the service period of the current TWT is more increased than the latency identified in the service period of the previous TWT.

According to various embodiments, it is determined that no traffic is received during the service period of the current TWT or whether the latency identified in the service period of the current TWT is more increased than the latency identified in the service period of the previous TWT (operation 905—YES), in operation 906, the electronic device may acquire the next TWT based on Equation (2).

$$\text{Next TWT} \leftarrow \text{current TWT} + T_{interval} + T_{unit\ time} \qquad (2)$$

For example, the current TWT may be a start time of the current TWT service period for communication with the AP 200.

$T_{interval}$ may refer to an interval time included in the TWT interval information included in the TWT parameter. $T_{unit\ time}$ may be designated by the manufacturer.

For example, when the latency for the traffic received after the service period of the previous TWT is over is greater than the latency identified for the service period of the previous TWT or no traffic is received from the AP 200 for the service period of the current TWT, the electronic device 101 may determine that the service period of the current TWT ends before the traffic reception time, and may delay the next TWT by a unit time (e.g., $T_{unit\ time}$) from the interval time included in the TWT interval information.

According to various embodiments, when the latency for the traffic received for the service period of the current TWT is the same as the latency for the traffic received for the service period of the previous TWT (operation 905—NO), in operation 907, the electronic device 101 may acquire the next TWT by reflecting the interval time included in the TWT interval information according to the TWT agreement.

Figure 11A:
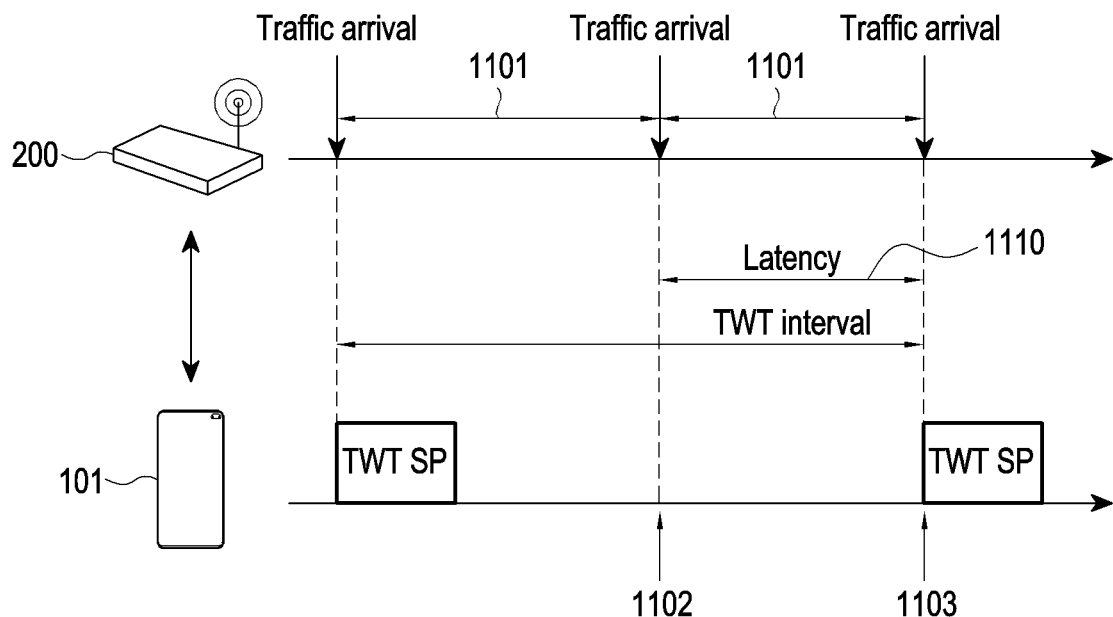
FIG. 11A is a diagram illustrating an example in which a traffic arrival period and a TWT interval period are different from each other according to various embodiments.
Figure 11B:
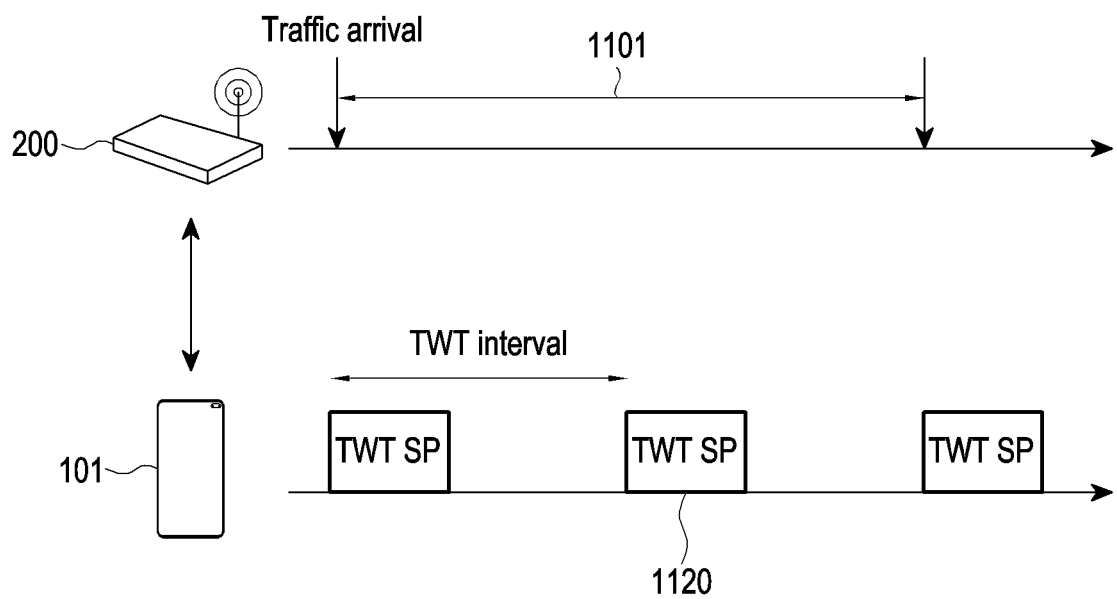
FIG. 11B is a diagram illustrating an example in which a traffic arrival period and a TWT interval period are different from each other according to various embodiments.

FIGS. 11A and 11B are diagrams illustrating an example in which a traffic arrival period and a TWT interval period are different according to various embodiments. For example, FIG. 11A illustrates a case in which an arrival period 1101 of traffic received from the server to the AP 200 is shorter than the TWT interval of the electronic device 101. As another example, FIG. 11B illustrates a case in which the TWT interval of the electronic device 101 is shorter than the arrival period of the traffic received from the server to the AP 200.

According to various embodiments, referring to FIG. 11A, in the case of traffic received by the AP 200 during a period in which the electronic device 101 is in a doze state rather than the TWT service period, since the latency 1110 of the traffic is from the time point 1102 received by the AP 200 to the next TWT service period start time 1103, there may be a problem in that the transmission is delayed and the user's experience of using the network is deteriorated.

According to various embodiments, when the arrival period of the traffic from the server (e.g., the server 108) to the AP 200 is shorter than the TWT interval, since the traffic load received from the AP 200 increases during one TWT service period, the electronic device 101 may control the next TWT based on the traffic load so that the traffic load received during one TWT service period is reduced. The operation of controlling the next TWT based on the traffic load will be described in greater detail below with reference to FIG. 12.

According to various embodiments, referring to FIG. 11B, since the TWT interval is shorter than the arrival period of the traffic received at the AP 200, the TWT service period 1120 of the electronic device 101 may start in a state where there is no traffic to be received from the AP 200, so that there may be a problem in that the electronic device 101 is switched from the doze state to the wake-up state and unnecessary power is consumed.

According to various embodiments, when the TWT interval is shorter than the arrival period 1101 of the traffic to the AP 200, the traffic load in the TWT service period with no traffic to be received from the AP 200 may not exist or be very small, so that the electronic device 101 may control the next TWT to increase the traffic load received in one TWT service period based on the traffic load. The operation of controlling the next TWT based on the traffic load will be described below with reference to FIG. 12.

FIG. 12 is a flowchart illustrating an example next TWT control operation according to various embodiments.

In FIG. 12, the operation of an electronic device (e.g., the electronic device 101 of FIG. 3) may be performed by a processor (e.g., the processor 120 or the communication processor 193 of the communication module 190) of the electronic device 101.

According to various embodiments, in operation 1201, the electronic device 101 may determine whether a traffic load is greater than a first threshold. For example, the electronic device 101 may determine whether a traffic load received during one TWT service period is greater than a first threshold. According to an embodiment, the electronic device 101 may identify the traffic load by measuring the amount of traffic received during one TWT service period, or may identify the traffic load by predicting the amount of traffic to be received for the TWT service period based on control information input by the user through the electronic device 101. For example, in a case in which the electronic device 101 is executing a game application, when the user controls a game character to walk, it may be determined that the traffic load is relatively small. When the user controls the game character to fight, it may be determined that the traffic load is relatively large.

According to various embodiments, when the traffic load received for one TWT service period is greater than a first threshold (operation 1201—YES), in operation 1202, the electronic device 101 may acquire the next TWT based on Equation (3).

$$\text{Next TWT} \leftarrow \text{current TWT} + T_{interval} - T \quad (3)$$

For example, the current TWT may be a start time of the current TWT service period for communication with the AP 200.

T interval may refer to an interval time included in the TWT interval information included in the TWT parameter. According to various embodiments, T may be an arbitrary value determined for controlling the next TWT based on the traffic load.

According to various embodiments, when the traffic load received for one service period is greater than a predetermined first threshold, the electronic device 101 may acquire, as the next TWT (e.g., the next TWT 702 of FIG. 7), a time (e.g., current TWT+$T_{interval}$-T) after a time shorter than the interval time included in the TWT interval information (e.g., the TWT wake interval mantissa 303 and/or the TWT wake interval exponent 304) of the TWT parameter from the current TWT (e.g., the TWT 301 of FIG. 3).

Figure 13A:
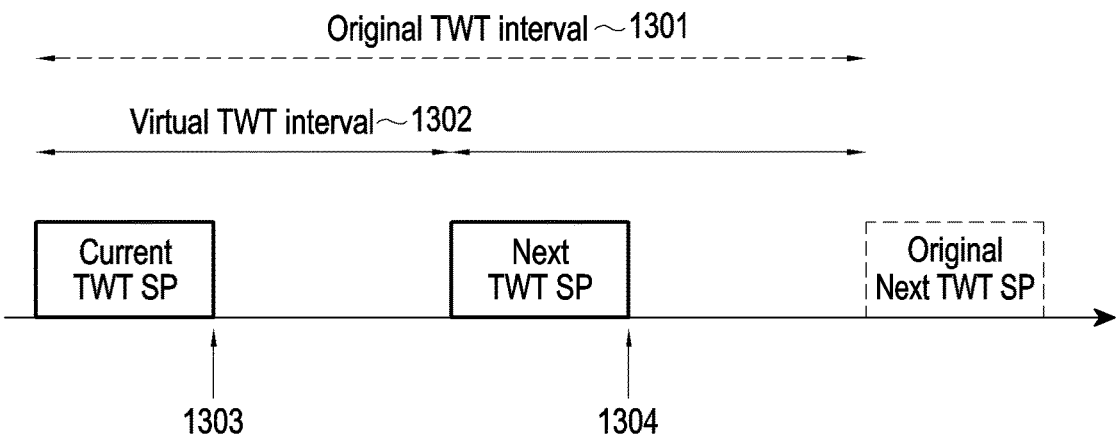
FIG. 13A is a diagram illustrating a next TWT controlled according to various embodiments.

For example, as shown in FIG. 13A, the electronic device 101 may acquire, as the next TWT, a time after a time shorter by T (e.g., $T_{interval}/2$) than an original TWT interval 1301 included in the TWT interval information from the current TWT, and may transmit a TWT information frame including the acquired next TWT to the AP 200 at a time point 1303 when the current TWT service period ends.

According to various embodiments, when a short TWT interval (e.g., $T_{interval} - T_{interval}/2$) is desired to be maintained, the electronic device 101 may transmit, to the AP 200, the TWT information frame including the next TWT acquired as the time after the time shorter by T (e.g., $T_{interval}/2$) than the original TWT interval 1301 at a time point 1304 when the next TWT SP ends.

According to various embodiments, the electronic device 101 may not correct the TWT interval information included in the TWT parameter, but may acquire the next TWT shorter than the interval time included in the TWT interval information, and may transmit, to the AP 200, the TWT information frame including the next TWT adjusted every time point when the TWT SP ends, thereby providing TWT services based on a virtual TWT interval 1302 shorter than the original TWT interval 1301 during a desired period.

In FIG. 12, a time after a time equal to a difference of T in $T_{interval}$ is acquired as the next TWT, but according to various embodiments, the electronic device 101 may acquire the next TWT by adding a time equal to $T_{interval}/2$ to the current TWT (e.g., next TWT←current TWT+$T_{interval}/2$). According to various embodiments, the virtual TWT interval 1302 is not limited to $T_{interval}/2$.

According to various embodiments, when the traffic load received for one TWT service period is less than the first threshold (operation 1201—NO), in operation 1203, the electronic device 101 may determine whether the traffic load received for one TWT service period is less than a second threshold.

According to various embodiments, when the traffic load received for one TWT service period is less than the second threshold (operation 1203—YES), in operation 1204, the electronic device 101 may acquire the next TWT based on Equation (4). For example, the fact that the traffic load received for one TWT service period is less than the second threshold may refer, for example, to the traffic load being small or there being no data packet received for a partial TWT service period.

$$\text{Next TWT} \leftarrow \text{current TWT} + T_{interval} + T \quad (4)$$

For example, the current TWT may be a start time of the current TWT service period for communication with the AP 200.

T interval may refer, for example, to an interval time included in the TWT interval information included in the TWT parameter. According to various embodiments, T may be an arbitrary value determined for controlling the next TWT based on the traffic load.

According to various embodiments, when the traffic load received during one service period is less than the predetermined second threshold, the electronic device 101 may acquire, as the next TWT (e.g., the next TWT 702 of FIG. 7), a time after a time longer than the interval time included in the TWT interval information (e.g., the TWT wake interval mantissa 303 and the TWT wake interval exponent 304) of the TWT parameter from the current TWT (e.g., the TWT 301 of FIG. 3).

Figure 13B:
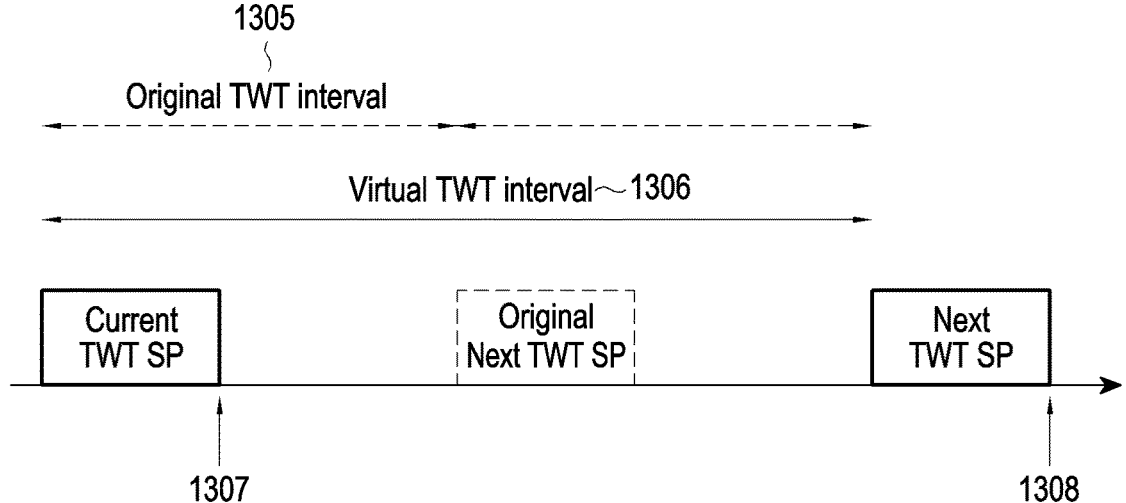
FIG. 13B is a diagram illustrating a next TWT controlled according to various embodiments.

For example, as shown in FIG. 13B, the electronic device 101 may acquire, as the next TWT, a time after a time (e.g., current TWT+$T_{interval}$ T) longer by T (e.g., $T_{interval}$) than the original TWT interval 1305 included in the TWT interval information from the current TWT, and may transmit the TWT information frame including the acquired next TWT to the AP 200 at a time point 1307 when the current TWT service period ends.

According to various embodiments, when the long TWT interval is desired to be maintained, the electronic device 101 may transmit, to the AP 200, the TWT information frame including the next TWT acquired as the time after the time longer by T (e.g., $T_{interval}$) than the original TWT interval 1305 at a time point 1308 when the next TWT service period ends.

According to various embodiments, the electronic device 101 may not correct the TWT interval information included in the TWT parameter, but may acquire the next TWT longer than the interval time included in the TWT interval information, and may transmit, to the AP 200, the TWT information frame including the next TWT adjusted every time point when the TWT service period ends, thereby providing the TWT services based on the virtual TWT interval 1306 longer than the original TWT interval 1305 during a desired period.

In FIG. 12, a time after the sum of T in $T_{interval}$ (e.g., current TWT+$T_{interval}$ T) is acquired as the next TWT, but according to various embodiments, the electronic device 101 may acquire the next TWT by adding a time equal to 2*T interval to the current TWT (e.g., next TWT←current TWT+2*$T_{interval}$) According to various embodiments, the virtual TWT interval 1306 is not limited to 2*$T_{interval}$.

According to various embodiments, when the traffic load received during one TWT service period is equal to or greater than the second threshold (operation 1203—NO), in operation 1205, the electronic device 101 may acquire the next TWT (e.g., current TWT+$T_{interval}$) by reflecting only the interval time included in the TWT interval information to the current TWT.

Figure 13C:
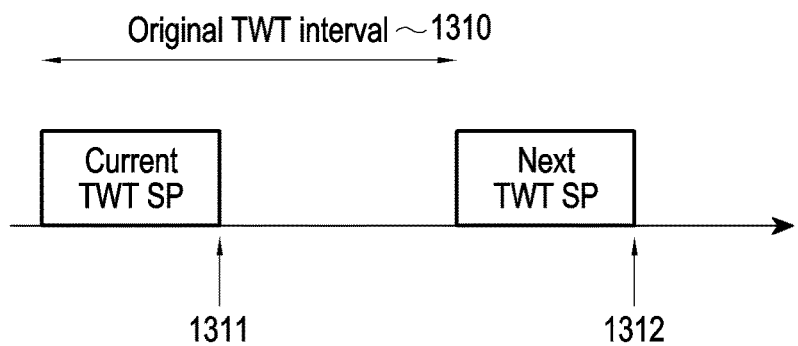
FIG. 13C is a diagram illustrating a next TWT controlled according to various embodiments.

For example, as shown in FIG. 13C, the electronic device 101 may acquire, as the next TWT, a time (e.g., current TWT+$T_{interval}$) after the original TWT interval 1301 included in the TWT interval information from the current TWT, and may transmit the TWT information frame including the acquired next TWT to the AP 200 at a time point 1311 when the current TWT service period ends.

According to various embodiments, when the original TWT interval is desired to be maintained, the electronic device 101 may transmit, to the AP 200, the TWT information frame including the next TWT acquired as the time after the original TWT interval 1301 at a time point 1312 when the next TWT service periods ends.

According to various embodiments, the electronic device 101 may configure two or more thresholds (e.g., the first threshold or the second threshold) for determining the traffic load. For example, the two or more thresholds for determining that there is a lot of traffic load may be configured, and a plurality of methods for calculating T (e.g., $T_{interval}$) may be configured. As another example, the two or more thresholds for determining that there is little traffic load may be configured, and a plurality of methods for calculating T (e.g., $T_{interval}$) may be configured.

According to various embodiments, the electronic device 101 may determine the traffic load periodically or whenever the state of an application being executed in the electronic device 101 is changed. For example, the traffic load may be determined for each N*TWT service period. As another example, the electronic device 101 may determine the traffic load when the state of an application (e.g., the application is executed in the background or the option of the application is changed) is changed.

According to various embodiments, a display module (e.g., the display module 160 of FIG. 1) included in the electronic device 101 may include a rollable or foldable display module. According to an embodiment, the electronic device 101 may detect a change in the display module (e.g., a rollable state or a foldable state) and may determine the traffic load based on the change in the display module. For example, when the change in the display module (e.g., a rollable state or a foldable state) is detected, a change in the resolution occurs and the capacity of data related to the executed application may be changed, so that the electronic device 101 may determine the traffic load when the display module is changed.

According to various embodiments, the electronic device 101 may perform a next TWT control operation based on a traffic arrival period and/or traffic latency received from the AP 200 (e.g., the AP 200 of FIG. 2). For example, the AP 200 may identify the traffic arrival period and/or the traffic latency received from the server 108 (e.g., the server 108 of FIG. 1), and may transmit identified information to the electronic device 101 when the identified information is periodically transmitted to the electronic device 101 or when the traffic arrival period and/or the traffic latency is changed by a designated threshold or greater. According to an embodiment, the AP 200 may monitor a difference between a time point when a packet arrives at the AP 200 from the server 108 and a time point when the packet is transmitted to the electronic device 101 with respect to downlink (DL) traffic, thereby determining whether an offset adjustment is required. According to an embodiment, when the offset adjustment is required, the AP 200 may transmit the TWT information frame to the electronic device 101 or the offset information to the electronic device 101. According to an embodiment, the electronic device 101 may perform a TWT control operation based on information (e.g., traffic arrival period and/or traffic latency) received from the AP 200.

According to various example embodiments, a method of controlling a target wake time (TWT) of an electronic device (e.g., the electronic device 101 of FIG. 1) may include: acquiring a TWT parameter including TWT interval information based on a TWT agreement with an access point (AP) (e.g., the AP 200 of FIG. 2), acquiring a next TWT based on TWT interval information included in the TWT parameter and a state of traffic received from the AP, and transmitting a TWT information frame including the next TWT to the AP.

According to various example embodiments, the acquiring of the next TWT may include identifying a first latency including an interval between a time point when traffic arrives at the AP from a server (e.g., the server 108 of FIG. 1) and a time point when the traffic is transmitted from the AP to the electronic device, and acquiring, as a second TWT including the next TWT, a time after a time shorter by a unit time than an interval time included in the TWT interval information from a first TWT including a current TWT, based on the first latency being equal to or greater than a threshold.

According to various example embodiments, the method of controlling the TWT of the electronic device may further include: acquiring, as a third TWT including the next TWT, a time after a time shorter by a unit time than the interval time included in the TWT interval information from the second TWT based on a second latency identified for the traffic received from the AP after the first TWT service period ends being less than the first latency, and acquiring, as a third TWT including the next TWT, a time after a time longer by the unit time than the interval time included in the TWT interval information from the second TWT based on the second latency being greater than the first latency or based on the traffic not being received during the second TWT service period.

According to various example embodiments, the identifying of the first latency may include identifying the first latency based on a time stamp of a time point based on the traffic being generated in the server and time information of a time point based on the electronic device receiving the traffic from the AP.

According to various example embodiments, the acquiring of the next TWT may include: identifying a first latency including an interval between a time point at which traffic arrives at the AP from the server and a time point at which the traffic is transmitted from the AP to the electronic device based on a global stand time shared by the electronic device, the AP, and the server, and acquiring, as the second TWT including the next TWT, a time after a time shorter by the first latency than the interval time included in the TWT interval information from the first TWT including the current TWT based on the first latency being equal to or greater than a threshold.

According to various example embodiments, the acquiring of the next TWT may include: receiving, from the AP, information on the first latency including the interval between a time point at which traffic arrives at the AP from the server and a time point at which the traffic is transmitted from the AP to the electronic device, and acquiring, as the second TWT including the next TWT, a time after a time shorter by the first latency than the interval time included in the TWT interval information from the first TWT including the current TWT.

According to various example embodiments, the acquiring of the next TWT may include: acquiring, as the next TWT, a time after a time shorter than the interval time included in the TWT interval information from the current TWT based on the traffic load received from the AP being equal to or greater than a first threshold, and acquiring, as the next TWT, a time after a time longer than the interval time included in the TWT interval information from the current TWT based on the traffic load being less than a second threshold.

According to various example embodiments, the method of controlling the TWT of the electronic device may further include: identifying the traffic load based on control information received from a user.

According to various example embodiments, the acquiring of the TWT parameter may include: establishing a TWT agreement with the AP based on an application executed in the electronic device, and acquiring the TWT parameter applied to the TWT agreement.

According to various example embodiments, the electronic device may include: a communication module comprising communication circuitry (e.g., the communication module 190 of FIG. 1) and a processor (e.g., the processor 120 of FIG. 1) operatively connected to the communication module. The processor may be configured to: acquire a target wake time (TWT) parameter including TWT interval information based on a TWT agreement with an access point (AP), to acquire a next TWT based on the TWT interval information included in the TWT parameter and a state of traffic received from the AP, and to control the communication module to transmit a TWT information frame including the next TWT to the AP.

According to various example embodiments, the processor may be configured to: identify a first latency including an interval between a time point at which traffic arrives at the AP from the server and a time point at which the traffic is transmitted to the electronic device from the AP, and to acquire, as a second TWT including the next TWT, a time after a time shorter by a unit time than the interval time included in the TWT interval information from a first TWT including the current TWT based on the first latency being equal to or greater than a threshold.

According to various example embodiments, the processor may be configured to: acquire, as a third TWT including the next TWT, a time after a time shorter by the unit time than the interval time included in the TWT interval information from the second TWT based on a second latency identified for the traffic received from the AP after the first TWT service period ends being less than the first latency, and to acquire, as the third TWT including the next TWT, a time after a time longer by the unit time than the interval time included in the TWT interval information from the second TWT based on the second latency being greater than the first latency or based on no traffic being received during the second TWT service period.

According to various example embodiments, the processor may be configured to: identify the first latency based on a time stamp at a time point at which the traffic is generated in the server and time information at a time point at which the electronic device receives the traffic from the AP.

According to various example embodiments, the processor may be configured to: identify the first latency including an interval between a time point at which traffic arrives at the AP from the server and a time point at which the traffic is transmitted from the AP to the electronic device based on a global standard time shared by the electronic device, the AP, and the server, and to acquire, as a second TWT including the next TWT, a time after a time shorter by the first latency than the interval time included in the TWT interval information from the first TWT including the current TWT based on the first latency being equal to or greater than a threshold.

According to various example embodiments, the processor may be configured to: receive, from the AP, information on the first latency including an interval between the time point when the traffic arrives at the AP from the server and the time point at which the traffic is transmitted from the AP to the electronic device, and acquire, as the second TWT including the next TWT, a time after a time shorter by the first latency than the interval time included in the TWT interval information from the first TWT including the current TWT.

According to various example embodiments, the processor may be configured to: acquire, as the next TWT, a time after a time shorter than the interval time included in the TWT interval information from the current TWT based on the traffic load received from the AP being equal to or greater than the first threshold, and acquire, as the next TWT, a time after a time longer than the interval time included in the TWT interval information from the current TWT based on the traffic load being less than the second threshold.

According to various example embodiments, the processor may be configured to identify the traffic load based on control information received from a user.

According to various example embodiments, the processor may be configured to: establish the TWT agreement with the AP based on the application executed in the electronic device, and acquire the TWT parameter applied to the TWT agreement.

According to various example embodiments, a communication module may include a transceiver (e.g., the transceiver 191 of FIG. 2) and a communication processor (e.g., the communication processor 193 of FIG. 2) operatively connected to the transceiver. The communication processor may be configured to: acquire a target wake time (TWT) parameter including TWT interval information based on a TWT agreement with an access point (AP), acquire a next TWT based on the TWT interval information included in the TWT parameter and a state of traffic received from the AP, and transmit a TWT information frame including the next TWT to the AP.

According to various example embodiments, the state of the traffic may include at least one of a latency including an interval between a time point at which the traffic arrives at the AP from the server and a time point at which the traffic is transmitted from the AP to the communication module, or a traffic load received from the AP, and the communication processor may acquire, as the next TWT, a time after a time longer or shorter than the interval time included in the TWT interval information from the current TWT based on the at least one of the latency or the traffic load.

The electronic device 101 according to various embodiments may be one of various types of electronic devices. The electronic device 101 may include, for example, a portable communication device (e.g., a smartphone), a computer device, a portable multimedia device, a portable medical device, a camera, a wearable device, a home appliance, or the like. According to an embodiment of the disclosure, the electronic device 101 is not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of controlling a target wake time (TWT) of an electronic device, the method comprising:

acquiring a TWT parameter comprising TWT interval information based on a TWT agreement with an access point (AP);

acquiring a next TWT based on the TWT interval information included in the TWT parameter and a state of traffic received from the AP, wherein the next TWT includes a time after a time longer or shorter than an interval time included in the TWT interval information from a current TWT; and transmitting a TWT information frame comprising the next TWT to the AP, wherein the state of traffic comprises at least one of a latency including an interval between a time point at which traffic arrives at the AP from a server and a time point based on the traffic being transmitted to the electronic device from the AP and/or a traffic load received from the AP.

2. The method of claim 1, wherein the acquiring of the next TWT comprises:

identifying a first latency including an interval between a time point at which traffic arrives at the AP from a server and a time point at which the traffic is transmitted from the AP to the electronic device; and acquiring, as a second TWT including the next TWT, a time after a time shorter by a unit time than the interval time included in the TWT interval information from a first TWT including a current TWT, based on the first latency being equal to or greater than a threshold.

3. The method of claim 2, further comprising:

acquiring, as a third TWT including the next TWT, a time after a time shorter by a unit time than the interval time included in the TWT interval information from the second TWT based on a second latency identified for the traffic received from the AP after the first TWT service period ends being less than the first latency; and acquiring, as the third TWT including the next TWT, a time after a time longer by the unit time than the interval time included in the TWT interval information from the second TWT based on the second latency being greater than the first latency or based on the traffic being not received during the second TWT service period.

4. The method of claim 2, wherein the identifying of the first latency comprises identifying the first latency based on a time stamp of a time point at which the traffic is generated in the server and time information of a time point at which the electronic device receives the traffic from the AP.

5. The method of claim 1, wherein the acquiring of the next TWT comprises:

identifying a first latency including an interval between a time point at which traffic arrives at the AP from the server and a time point at which the traffic is transmitted from the AP to the electronic device based on a global stand time shared by the electronic device, the AP, and the server; and acquiring, as the second TWT including the next TWT, a time after a time shorter by the first latency than the interval time included in the TWT interval information from the first TWT including the current TWT based on the first latency being equal to or greater than a threshold.

6. The method of claim 1, wherein the acquiring of the next TWT comprises:

receiving, from the AP, information on the first latency including the interval between a time point at which traffic arrives at the AP from the server and a time point at which the traffic is transmitted from the AP to the electronic device; and acquiring, as the second TWT including the next TWT, a time after a time shorter by the first latency than the interval time included in the TWT interval information from the first TWT that is the current TWT.

7. The method of claim 1, wherein the acquiring of the next TWT comprises:

acquiring, as the next TWT, a time after a time shorter than the interval time included in the TWT interval information from the current TWT based on the traffic load received from the AP being equal to or greater than a first threshold; and acquiring, as the next TWT, a time after a time longer than the interval time included in the TWT interval information from the current TWT based on the traffic load being less than a second threshold.

8. The method of claim 7, further comprising identifying the traffic load based on control information received from a user.

9. The method of claim 1, wherein the acquiring of the TWT parameter comprises establishing a TWT agreement with the AP based on an application executed in the electronic device, and acquiring the TWT parameter applied to the TWT agreement.

10. An electronic device comprising:

a communication module comprising communication circuitry; and a processor operatively connected to the communication module, wherein the processor is configured to:

acquire a target wake time (TWT) parameter comprising TWT interval information based on a TWT agreement with an access point (AP), acquire a next TWT based on the TWT interval information included in the TWT parameter and a state of traffic received from the AP, wherein the next TWT includes a time after a time longer or shorter than an interval time included in the TWT interval information from a current TWT, and control the communication module to transmit a TWT information frame comprising the next TWT to the AP, wherein the state of traffic comprises at least one of a latency including an interval between a time point at which traffic arrives at the AP from a server and a time point based on the traffic being transmitted to the electronic device from the AP and/or a traffic load received from the AP.

11. The electronic device of claim 10, wherein the processor is configured to:

identify a first latency including an interval between a time point at which traffic arrives at the AP from the server and a time point based on the traffic being transmitted to the electronic device from the AP, and acquire, as a second TWT including the next TWT, a time after a time shorter by a unit time than the interval time included in the TWT interval information from a first TWT including the current TWT based on the first latency being equal to or greater than a threshold.

12. The electronic device of claim 11, wherein the processor is configured to:

acquire, as a third TWT including the next TWT, a time after a time shorter by the unit time than the interval time included in the TWT interval information from the second TWT based on a second latency identified for the traffic received from the AP after the first TWT service period ends being less than the first latency, and acquire, as the third TWT including the next TWT, a time after a time longer by the unit time than the interval time included in the TWT interval information from the second TWT based on the second latency being greater than the first latency or based on no traffic being received during the second TWT service period.

13. The electronic device of claim 11, wherein the processor is configured to: identify the first latency based on a time stamp at a time point at which the traffic is generated in the server and time information at a time point at which the electronic device receives the traffic from the AP.

14. The electronic device of claim 10, wherein the processor is configured to:
identify the first latency including an interval between a time point at which traffic arrives at the AP from the server and a time point at which the traffic is transmitted from the AP to the electronic device based on a global standard time shared by the electronic device, the AP, and the server, and
acquire, as a second TWT including the next TWT, a time after a time shorter by the first latency than the interval time included in the TWT interval information from the first TWT including the current TWT based on the first latency being equal to or greater than a threshold.

15. The electronic device of claim 10, wherein the processor is configured to:
receive information on the first latency including an interval between the time point at which the traffic arrives at the AP from the server and the time point at which the traffic is transmitted from the AP to the electronic device, and
acquire, as the second TWT including the next TWT, a time after a time shorter by the first latency than the interval time included in the TWT interval time from the first TWT that is the current TWT.

16. The electronic device of claim 10, wherein the processor is configured to:
acquire, as the next TWT, a time after a time shorter than the interval time included in the TWT interval information from the current TWT based on the traffic load received from the AP being equal to or greater than a first threshold; and
acquire, as the next TWT, a time after a time longer than the interval time included in the TWT interval information from the current TWT based on the traffic load being less than a second threshold.

17. The electronic device of claim 16, wherein the processor is configured to:
identify the traffic load based on control information received from a user.

18. The electronic device of claim 10, wherein the processor is configured to:
establish a TWT agreement with the AP based on an application executed in the electronic device, and acquire the TWT parameter applied to the TWT agreement.

19. A communication module, comprising:
a transceiver; and
a communication processor operatively connected to the transceiver,
wherein the communication processor is configured to:
acquire a target wake time (TWT) parameter comprising TWT interval information based on a TWT agreement with an access point (AP),
acquire a next TWT based on the TWT interval information included in the TWT parameter and a state of traffic received from the AP, wherein the next TWT includes a time after a time longer or shorter than an interval time included in the TWT interval information from a current TWT, and
control the transceiver to transmit a TWT information frame comprising the next TWT to the AP,
wherein the state of traffic comprises at least one of a latency including an interval between a time point at which traffic arrives at the AP from a server and a time point based on the traffic being transmitted to the electronic device from the AP and/or a traffic load received from the AP.

* * * * *